Figure 1:
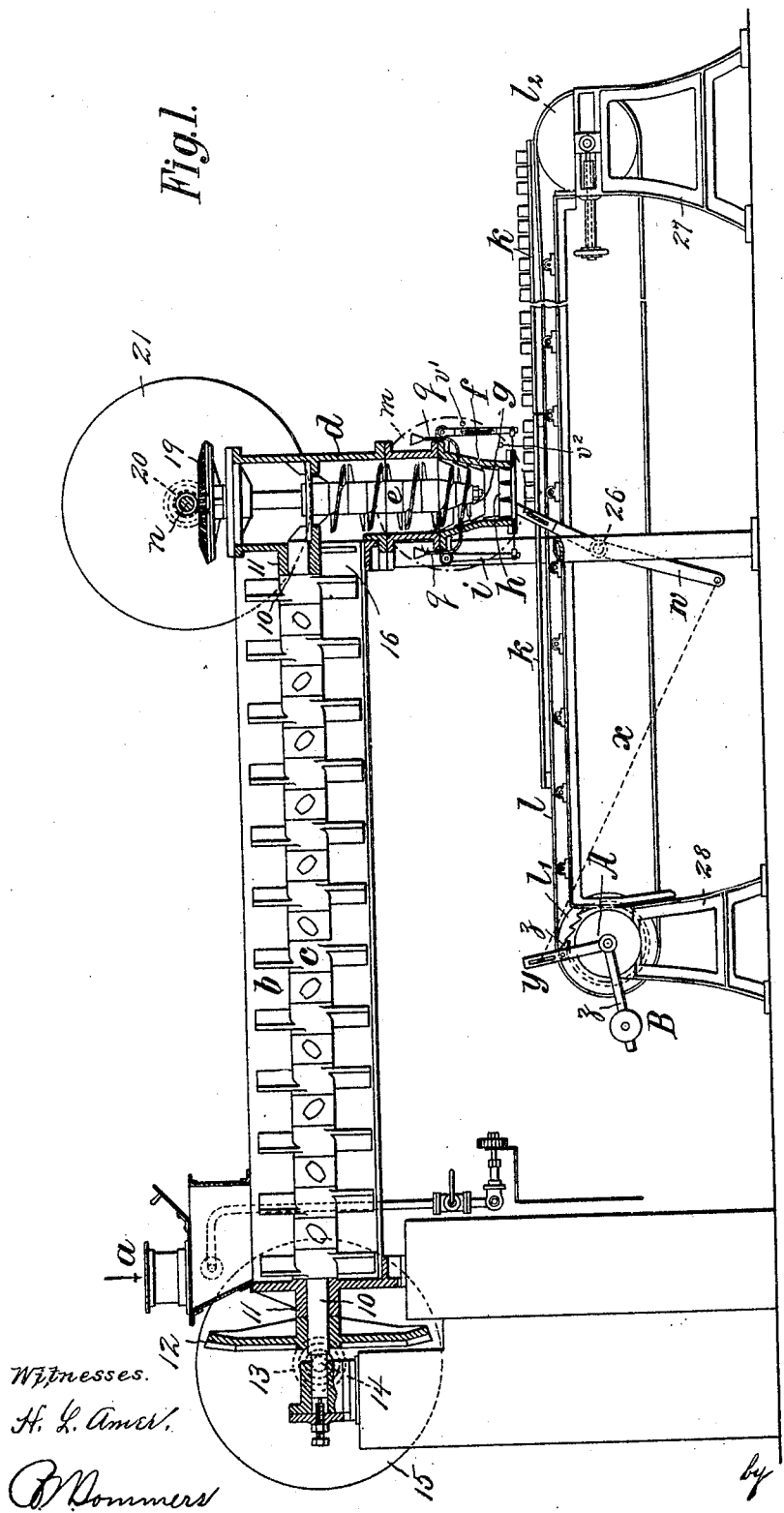

No. 804,402. PATENTED NOV. 14, 1905.
G. HÖPFNER.
MACHINE FOR MANUFACTURING BRIQUETS.
APPLICATION FILED JUNE 26, 1905.
3 SHEETS—SHEET 2.
Fig. 2.
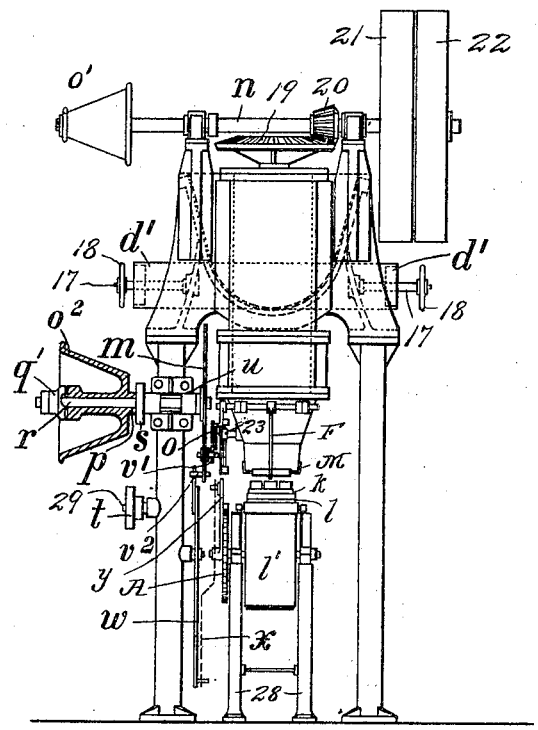
Fig. 3. Fig. 4. Fig. 5.
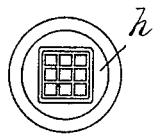 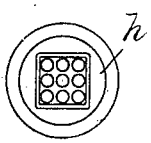 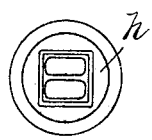
Witnesses
H. L. Amer.
R. W. Sommers.
Inventor.
Gottfried Höpfner.
by Henry Orth atty.

No. 804,402. PATENTED NOV. 14, 1905.
G. HÖPFNER.
MACHINE FOR MANUFACTURING BRIQUETS.
APPLICATION FILED JUNE 26, 1905.
3 SHEETS—SHEET 3.
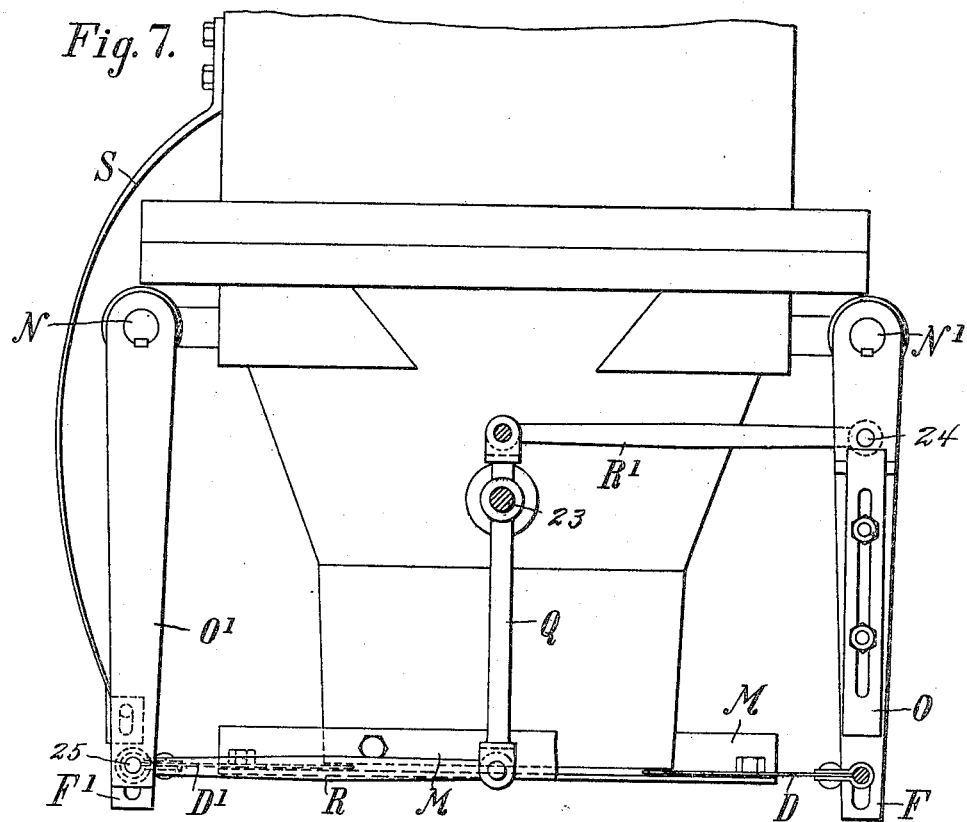
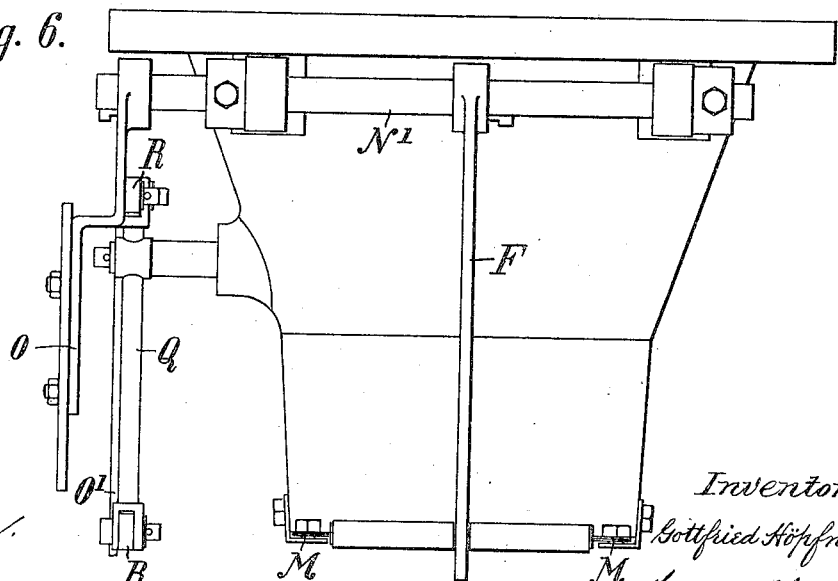

UNITED STATES PATENT OFFICE.

GOTTFRIED HÖPFNER, OF BLECKENDORF, GERMANY, ASSIGNOR TO WILLY VON LEWINSKI, OF BRESLAU, PRUSSIA, GERMANY.

MACHINE FOR MANUFACTURING BRIQUETS.

No. 804,402.     Specification of Letters Patent.     Patented Nov. 14, 1905.

Application filed June 26, 1905. Serial No. 267,038.

*To all whom it may concern:*

Be it known that I, GOTTFRIED HÖPFNER, a subject of the King of Prussia, German Emperor, and a resident of Chausseestrasse 12, Bleckendorf, Province of Saxony, Germany, (whose post-office address is Chausseestrasse 12, Bleckendorf, Province of Saxony, Germany,) have invented certain new and useful Improvements in and Relating to Machines for Manufacturing Briquets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to machines for making briquets, and has for its object to continuously operate and to discharge the briquets onto a carrier timed to operate from a moving part of the machine; and it consists of the construction and arrangement of parts hereinafter described and claimed.

Referring to the drawings, in which like parts are similarly designated, Figure 1 is a longitudinal section with parts shown in elevation. Fig. 2 is a side view, partly in section. Figs. 3, 4, and 5 are plan views of the mouthpiece insertions or forms $h$. Figs. 6 and 7 are details.

The machine consists of a mixing apparatus in combination with a molding-machine provided with a device timed to cut off the material as it emerges from the mouth or nozzle of the molding-machine, said mixing apparatus being organized to progress the material as it is mixed and feed it into the molding-machine, the briquets being cut off and dropped onto a conveyer-band $l$, timed to operate after the cutter has severed the briquets.

The mixing vessel consists of a horizontal cylinder $b$, provided with a feed inlet or hopper $a$ for the material that is to be worked up into briquets. A shaft 10 extends through the cylinder $b$ and is mounted in bearings 11 at the ends thereof. The shaft is provided with suitable mixer-blades $c$.

On the shaft 10 is mounted a bevel-gear 12, driven by a bevel-pinion 13, on whose shaft 14 is mounted a belt-pulley 15 to drive the mixer-blades. These blades mix the material and during the mixing move it through the cylinder $b$ toward its discharge-opening 16, the size of which is controlled by slides $d'$ $d'$, one on each side of the cylinder $b$, each operated by a screw-spindle 17 and hand-wheel 18, Fig. 2, thereby regulating the quantity of material delivered from the mixer to the molder.

The molding device consists of a vertical cylinder $d$, provided with a gradually-contracting mouthpiece or nozzle $f$, in which is mounted a conveyer-worm $e$, on the end of whose shaft is a bevel-wheel 19, driven by a bevel-pinion 20 on a counter-shaft $n$, mounted in the frame of the machine. 21 is a fast and 22 is a loose driving-pulley mounted on shaft $n$.

The mouthpiece $f$ is provided with pipes $q$ to supply water to the material as it is forced through the nozzle $f$, thereby preventing the material from sticking to the sides and to the insertion-pieces $h$, Figs. 3, 4, and 5, the moistening of the material just as it leaves the machine giving the briquets a smooth glazed appearance.

On one end of shaft $n$ is a cone-wheel $o'$, and below this wheel is a shorter shaft $r$, mounted in bearing $u$ on the frame of the machine. A second cone-wheel $o^2$, having a belt disk or pulley $p$ cast thereon, is loosely mounted on the short shaft $r$ and capable of being connected thereto by the coupling-clutch $q'$. A step-pulley $s$ is keyed to the shaft $r$, which also carries the controller-disk $m$, carrying two adjustable pins $v'$ and $v^2$. The pin $v'$ contacts with the lever O, Fig. 7, mounted on rod N', that carries the actuating-rod F for one of the two knives D D', that are moved to and from each other and guided in slideways M of angle-irons mounted at the bottom of the mouthpiece $f$.

The lever O has pivoted to it at 24 one end of a connecting-rod R', whose opposite end is connected to the end of the shorter arm of lever Q, mounted on a pin 23, secured to the mouthpiece or nozzle $f$. The end of the longer arm of this lever Q is connected to the end of a connecting-rod R, similar to the one R', the other end of said rod R being connected at 25 to the end of lever O', keyed to the rod N, on which is rigidly mounted the lever F', similar to the lever F, and which operates the other knife D'. The lever F is urged by a spring S, connected to a suitable stationary part and here shown as the casing $d$ of the molder The pin $v^2$ on disk $m$ engages the lever $w$, pivoted at 26 on the frame.

The lower end of lever $w$ is connected by rod $x$ to an elbow-lever $y$, carrying a weight B on one arm and a pawl $z$ on the other arm, that operates a ratchet-wheel A. The ratchet-wheel A is rigidly mounted on a drum $l'$, over which travels a conveyer-band $l$, said drum being mounted in a suitable standard 28. A similar drum $l^2$ is adjustably mounted in the standard 27, so as to be able to take up any slack in the band $l$.

On the band rest suitable gratings $k$, onto which the briquets are deposited during the step-by-step movement of the band, so that the grids with the briquets thereon can be taken off from the end of the band at the drum $l^2$ and other gratings placed on it at the beginning thereof near the drum $l'$.

Beneath the cone-wheel $o'$ and its band-pulley $p$ is a stepped pulley $t$, mounted on a stub-shaft 29 on the frame, so that $p$ may be belted to $t$ and $t$ belted to $s$ to further reduce the speed of disk $m$, and thereby make thicker briquets, if desired.

If cone-wheel $o'$ be bolted to the cone-pulley $o^2$, so that the belt will be on the largest diameter of $o'$ and on the smallest diameter of $o^2$, the controller-disk $m$ will make its greatest number of revolutions, and if the belt be shifted to the opposite ends of these pulleys the speed will be less, it of course being understood that the clutch $q'$ holds the cone-wheel $o^2$ locked to the shaft $r$.

Should it be desired to have a further reduction of speed, the coupling $q'$ is disengaged, so that cone-wheel $o^2$ can run free, and the wheel $p$ on the end of the cone-wheel $o^2$ is belted to the larger step on the pulley $t$ and the smaller step on pulley $t$ is belted to the wheel $s$.

The insertions or molding ends $h$ may be of various forms, as shown in Figs. 3, 4, and 5, and can be rapidly changed so as to change the form and size as desired, the thicknesses being regulated by the speed of the controller-disk $m$. When the speed of this disk is greater, a shorter string will have been forced through the nozzle $f$, to be cut off by the knives D D′, actuated by the pin $v^2$, than when the speed is slower. Altering the speed of the disk also alters the periods of progression of the carrier.

Having thus described my invention, what I claim as new therein, and desire to secure by Letters Patent, is—

1. In a briquet-machine, a horizontal mixing vessel, driven mixer-blades therein to mix and progress the material through the vessel, a vertical molding-chamber into which the mixing-chamber discharges, removable inserts or forms at the end of the chamber to give the material the desired peripheral shape, means to force the material discharged from the vessel into the chamber through the forms and cutters timed to cut the material as it emerges from the forms, and means to alter the time of operation of the cutters to vary the size of the briquets, substantially as described.

2. In a briquet-machine, a vertical molding-chamber, a substantially horizontal mixing-chamber discharging into the molding-chamber, slides to vary the size of the discharge-opening in the mixing-chamber to vary the quantity of mixed material supplied to the molding-chamber, a nozzle at the bottom of the molding-chamber, a removable insert or form in said nozzle, means to supply water to the inside of the nozzle to lubricate the sides of the nozzle contacting with the packed clay to glaze the surface of the clay as it enters the form and knives acting against the end of the nozzle, substantially as described.

3. In a briquet-machine, a molding-chamber having a contracted end, a mixing vessel discharging into the same, driven mixer-blades to mix and progress the material through the vessel, means to regulate the discharge from said vessel to the chamber, a screw to force the material through the chamber, means to supply water to the interior walls of the molding-chamber at its contracted end, a removable insert or form in the end of the chamber, knives mounted at the end of the chamber, mechanism to drive said screw and devices driven by said mechanism to operate the knives, said devices including means to vary the time of the operation of the knives, substantially as described.

4. In a briquet-machine, the combination with a molding-chamber, a removable insert or form in its end and means to force the material through said chamber and form; of knives coöperating with the end of the chamber, a conveyer under the end of the chamber, mechanism to impart movement to the conveyer, and mechanism to operate the conveyer and knives, including means to vary the time of operation of both the knives and conveyer, substantially as described.

5. In a briquet-machine, a molding-chamber having a contracted end, removable inserts or forms therein, a screw to force the material through the chamber and forms, a cutter mechanism having an actuating-lever, means to drive the screw, a controller-disk, a carrier movable at the end of the chamber, devices to intermittently move the carrier, means on the controller-disk to actuate said arm and additional means subsequently brought into operation to actuate said devices to move the carrier and mechanism to drive the controller-disk at different speeds to vary the thickness of the briquets, substantially as described.

6. In a briquet-machine, a molding-chamber having a contracted end, a removable insert or form in said end, a pair of reciprocating knives movable under said end, an actuating-lever for said knives, means to supply water to the contracted end of the molding-chamber, a carrier, mechanism to impart to said carrier periodic motion, a driven controller-disk, two pins therein one to move the actuating-lever and the other to actuate the carrier mechanism, substantially as described.

7. In a briquet-machine, a molding-chamber, means to force the material through the chamber, knives to cut the material as it leaves the chamber, a conveyer, a pawl-and-ratchet mechanism to move the conveyer, a driven controller-disk, two pins in said disk one operating the knives during a portion of its travel and the other the pawl-and-ratchet mechanism, and a weight to return the pawl-and-ratchet mechanism to normal position after being actuated by its pin, substantially as described.

8. In a briquet-machine, a molding-chamber, means to force the material through the chamber, reciprocal knives D, D', levers F, F' to actuate the same, shafts N, N' to which the levers are secured, arms O, O' connected to said shafts, means connecting the levers O, O' to impart opposite movement to the knives and a driven controller-disk to periodically move one of the arms and thereby actuate the knives, substantially as described.

9. In a briquet-machine, a molding-chamber, means to force material therethrough, reciprocable knives at the end of the chamber, a controller-disk to periodically actuate the knives, a shaft on which said disk is mounted, a cone-wheel loose on said shaft, a clutch to connect the wheel and said shaft, a second oppositely-directed driven cone-wheel from which the loose cone-wheel is driven, a belt-pulley on the loose cone-wheel, a stepped pulley secured to said shaft and a second stepped pulley, said second stepped pulley driven from the belt-pulley on the cone-wheel and the first stepped pulley driven from the second stepped pulley, whereby different speeds may be given to the controller-disk to correspondingly vary the thickness of the briquets, substantially as described.

10. In a briquet-machine, a vertical molding-chamber having a contracted end, a substantially horizontal mixing vessel discharging into the molding-chamber, driven mixer-blades therein to mix and progress the material through the vessel, adjustable slides to control the quantity of material discharged in the molding-chamber, an insert or form in the end of the molding-chamber, water-supply pipes to feed water to the contracted end of the chamber, a driven shaft, a screw to force the material through the chamber and geared to said shaft, knives mounted at the mouth of the chamber, lever mechanism to connect the knives to simultaneously move them in opposite directions, a carrier below the molding-chamber, a pawl-and-ratchet mechanism to periodically progress the carrier, a controller-disk driven from said shaft, means on the disk to actuate the knives and the pawl-and-ratchet mechanism, a spring to automatically return the knives to operative position after actuation by the disk, a weight to return the pawl-and-ratchet mechanism to operative position after actuation by the disk, and mechanism to change the speed of the disk thereby altering the thickness of the briquets and the length of the periods of progression of the carrier, substantially as described.

In testimony that I claim the foregoing as my invention I have signed my name in presence of two subscribing witnesses.

GOTTFRIED HÖPFNER.

Witnesses:
   ADOLF FRANKE,
   B. CABELL.